United States Patent [19]
Stephenson, III

[11] Patent Number: 5,930,534
[45] Date of Patent: Jul. 27, 1999

[54] FLIP-UP FLASH WHICH INTEGRATES WITH FILM ROLL CHAMBER WHEN FOLDED TO MAKE ONE-TIME-USE CAMERA COMPACT

[75] Inventor: Stanley W. Stephenson, III, Spencerport, N.Y.

[73] Assignee: Eastman Kodak Company, Rochester, N.Y.

[21] Appl. No.: 09/037,230

[22] Filed: Mar. 10, 1998

[51] Int. Cl.⁶ .................................................. G03B 15/03
[52] U.S. Cl. ............................................................ 396/178
[58] Field of Search .................................... 396/155, 176, 396/177, 178

[56] References Cited

U.S. PATENT DOCUMENTS 2,783,696  3/1957  Sewig .
5,598,238  1/1997  Stephenson et al. .
5,613,169  3/1997  Stephenson .

*Primary Examiner*—Howard B. Blankenship
*Attorney, Agent, or Firm*—Roger A. Fields

[57] ABSTRACT

A compact camera comprising a body housing, a film roll chamber within the body housing, and a flip-up flash pivotally connected to the body housing to permit the flip-up flash to be flipped up from the body housing for use and flipped down to the body housing for storage, is characterized in that the body housing has a protruding portion that at least partially forms the film roll chamber, and the flip-up flash has a flash housing with a cavity for receiving the protruding portion when the flip-up flash is flipped down to the body housing, to integrate the flash housing with the body housing.

5 Claims, 2 Drawing Sheets

FLIP-UP FLASH WHICH INTEGRATES WITH FILM ROLL CHAMBER WHEN FOLDED TO MAKE ONE-TIME-USE CAMERA COMPACT

FIELD OF THE INVENTION

The invention relates generally to the field of photography, and in particular to compact cameras. More specifically, the invention relates to a compact camera having a flip-up flash which is integrated with a film roll chamber when folded in order to achieve compactness.

BACKGROUND OF THE INVENTION

Film and cameras that are all in one, commonly referred to as single-use or one-time-use cameras, have become well known. The one-time-use camera is a simple point-and-shoot type comprising a plastic main body part which supports a conventional film cartridge in a cartridge receiving chamber, an unexposed film roll in a film supply chamber, a fixed-focus taking lens, a film metering mechanism with a rotatably supported metering sprocket that intermittently engages the filmstrip at successive film perforations, a manually rotatable thumbwheel rotatably engaged with a film spool inside the film cartridge, a single-blade shutter, a manually depressible shutter release button, a rotatable frame counter for indicating the number of exposures remaining for picture-taking, a direct see-through viewfinder, and in some models an electronic flash. A pair of opaque plastic front and rear cover parts house the main body part between them to complete the camera. The rear cover part connects to the main body part and/or to the front cover part to make the main body part light-tight. A decorative cardboard outer box or label at least partially covers the camera and has respective openings for the taking lens, etc.

After each picture is taken with the one-time-use camera, the photographer manually rotates the thumbwheel in a film winding direction to similarly rotate the film spool inside the film cartridge. This winds an exposed section of the filmstrip into the film cartridge. The rewinding movement of the filmstrip the equivalent of slightly more than one frame width rotates the metering sprocket in engagement with the respective film perforations to decrement the frame counter to its next lower-numbered setting and to pivot a metering lever into engagement with the thumbwheel in order to prevent further manual rotation of the thumbwheel. Manually depressing the shutter release button to take another picture pivots the metering lever out of engagement with the thumbwheel to permit renewed rotation of the thumbwheel. When the maximum number of exposures available on the filmstrip are exposed, and the filmstrip is completely wound off the take-up spool and into the film cartridge, the one-time-use camera is given to a photofinisher who tears the outer box off the camera, separates the rear cover part from the main body part, and removes the film cartridge with the exposed filmstrip from the cartridge receiving chamber. Then, he removes the exposed filmstrip from the film cartridge to develop the negatives and make prints for the customer. At least some of the used parts of the camera may be recycled, i.e. reused, to remanufacture the camera.

Early models of one-time-use cameras tended to be less than compact and, therefore, were difficult to fit into one's pocket or purse. Thus, there has been a continuous desire to make one-time-use cameras compact. However, with more recent cameras that are compact and include an electronic flash, the relative closeness of the electronic flash and the taking lens can cause an undesirable phenomenon known as "red-eye" to occur. This effect causes the pupils of the eyes of a person being photographed to appear as red dots in a print made from the color negative.

To reduce the occurrence of red-eye during flash picture-taking, reloadable cameras have included a flip-up flash which is pivotally connected to the body housing of the camera to be flipped up from the body housing for use and flipped down for storage. When flipped up, the flip up flash increases the flash-to-lens distance and, therefore makes red-eye less likely to occur. However, some compactness of the camera is sacrificed.

SUMMARY OF THE INVENTION

A compact camera comprising a body housing, a film roll chamber within the body housing, and a flip-up flash pivotally connected to the body housing to permit the flip-up flash to be flipped up from the body housing for use and flipped down to the body housing for storage, is characterized in that:

the body housing has a protruding portion that at least partially forms the film roll chamber; and the flip-up flash has a flash housing with a cavity for receiving the protruding portion when the flip-up flash is flipped down to the body housing, to integrate the flash housing with the body housing.

DETAILED DESCRIPTION OF THE INVENTION

The invention is disclosed as being embodied preferably in a one-time-use camera. Because the features of a one-time-use camera are generally known, the description which follows is directed in particular only to those elements forming part of or cooperating directly with the disclosed embodiment. It is to be understood, however, that other elements may take various forms known to a person of ordinary skill in the art.

Figure 1:
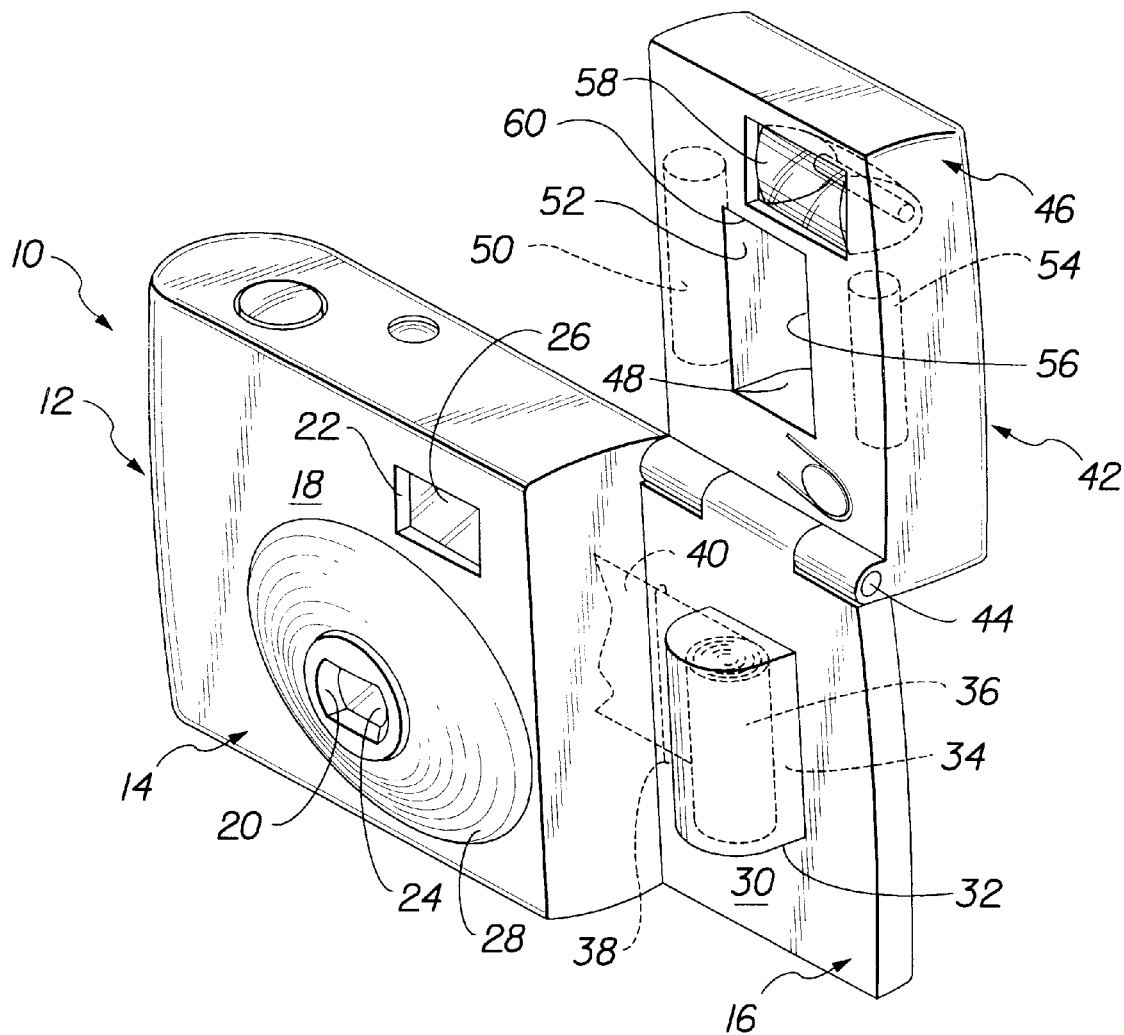
FIG. 1 is a front perspective view of a compact camera with a flip-up flash according to a preferred embodiment of the invention, showing the flip-up flash flipped up.
Figure 2:
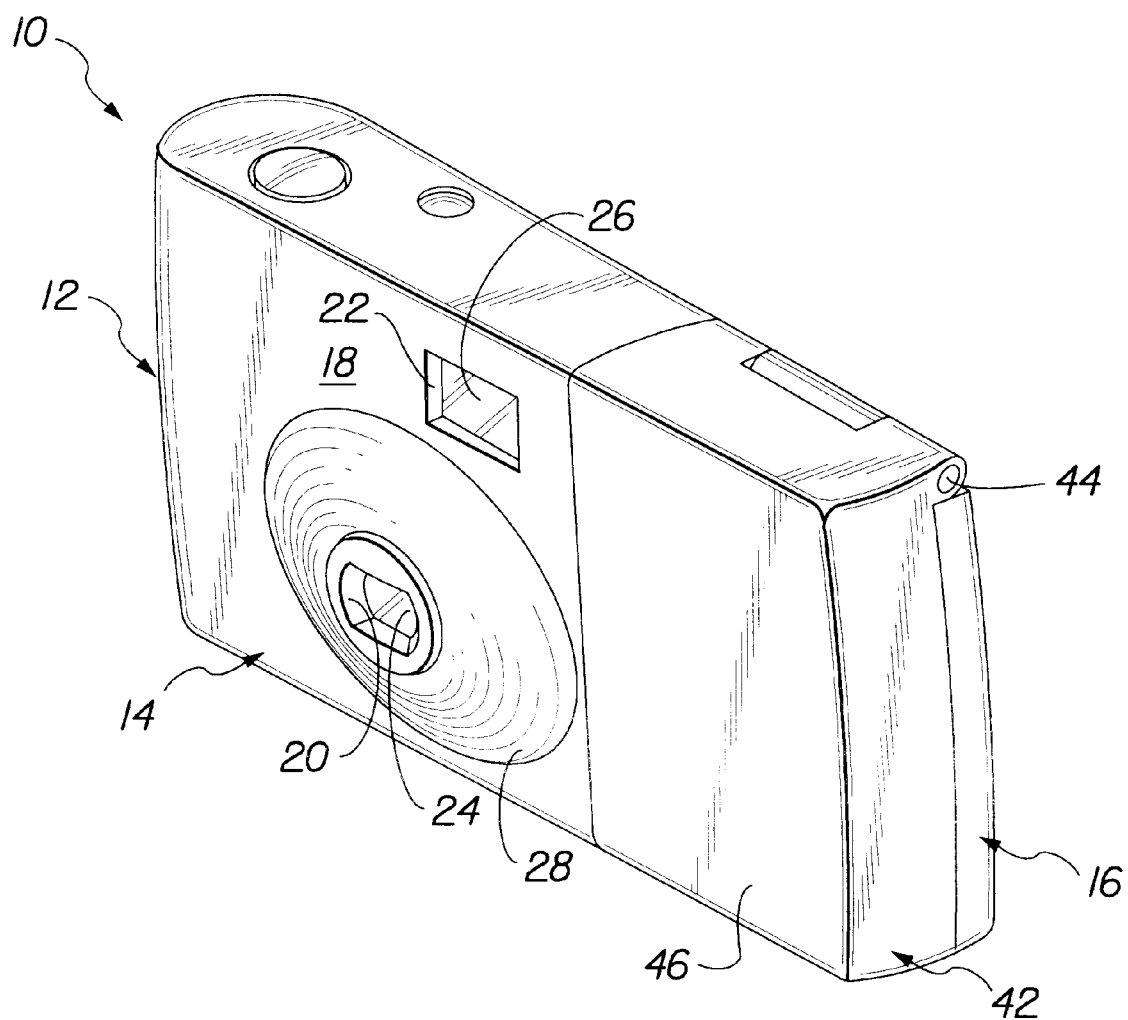
FIG. 2 is a front perspective view of the compact camera with the flip-up flash, showing the flip-up flash flipped down or folded.

Referring now to the drawings, FIGS. 1 and 2 show a one-time-use camera 10 having an opaque body housing 12 with a major housing portion 14 and a minor, i.e. smaller, housing portion 16. The major housing portion 14 has a front face 18 that includes respective openings 20 and 22 for a taking lens 24 and a front viewfinder lens 26. The front face 18 is flat except for an oval-shaped lens surround 28. The minor housing portion 16 has a front face 30 that includes a protruding portion 32. The front face 30 is flat except for the protruding portion 32 and is substantially recessed from the front face 18 as shown in FIG. 1. The protruding portion 32 is curved to form a film roll chamber 34 at its inside that contains an unexposed film roll 36. A film ingress slot 38 is located adjacent the chamber 34 to permit unexposed film sections 40 to be drawn off the unexposed film roll 36 for successive exposure behind the taking lens 24.

A flip-up electronic flash 42 is pivotally connected to the minor housing portion 16 at a pivot pin 44, to be flipped up from the minor housing portion for use as shown in FIG. 1 and to be flipped down to the minor housing portion for storage as shown in FIG. 2.. The flip-up flash 42 has a flash housing 46 with a cavity or opening 48 for receiving the protruding portion 32 when the flip-up flash is flipped down. A battery 50 is located within the flash housing 46 proximate one side 52 of the cavity 48 and a capacitor 54 is located within the flash housing proximate another side 56 of the cavity. A flash emission window 58 is located within the flash housing 46 proximate one end 60 of the cavity 48.

The invention has been described with reference to a preferred embodiment. However, it will be appreciated that variations and modifications can be effected by a person of ordinary skill in the art without departing from the scope of the invention. For example, instead of the protruding portion 32 being shaped to form the film roll chamber 34 for the unexposed film roll 36, it can be shaped for the film roll chamber to contain a film cartridge.

PARTS LIST

10. one-time-use camera
12. body housing
14. major housing portion
16. minor housing portion
18. front face
20. opening
22. opening
24. taking lens
26. viewfinder lens
28. lens surround
30. front face
32. protruding portion
34. film roll chamber
36. unexposed film roll
38. film ingress slot
40. unexposed film roll section
42. flip-up flash
44. pivot pin
46. flash housing
48. cavity
50. battery
52. side
54. capacitor
56. side
58. flash emission window
60. end

What is claimed is:

1. A compact camera comprising a body housing, a film roll chamber within said body housing, and a flip-up flash pivotally connected to said body housing to permit said flip-up flash to be flipped up from the body housing for use and flipped down to the body housing for storage, is characterized in that:

said body housing has a protruding portion that at least partially forms said film roll chamber; and said flip-up flash has a flash housing with a cavity for receiving said protruding portion when the flip-up flash is flipped down to said body housing, to integrate said flash housing with said body housing.

2. A compact camera as recited in claim 1, wherein said flip-up flash has a battery within said flash housing proximate one side of said cavity and a capacitor within the flash housing proximate another side of the cavity.

3. A compact camera as recited in claim 2, wherein said flash housing has a flash emission window proximate one end of said cavity.

4. A compact camera as recited in claim 1, wherein said body housing has a major portion with a front face that includes respective lens openings for a taking lens and a viewfinder lens and has a minor portion with a front face that includes said protruding portion and is recessed from said front face of the major portion to provide room for said flash housing when said flip-up flash is flipped down.

5. A compact camera as recited in claim 4, wherein said front face of the minor portion is flat except for said protruding portion.

* * * * *